Sept. 14, 1948.    U. LAMM    2,449,396
MEANS FOR INFLUENCING THE BLOCKING VOLTAGE
IN CURRENT CONVERTER VALVES
Filed Dec. 3, 1945
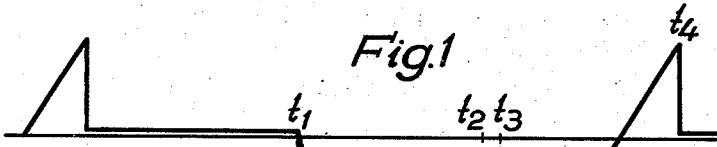
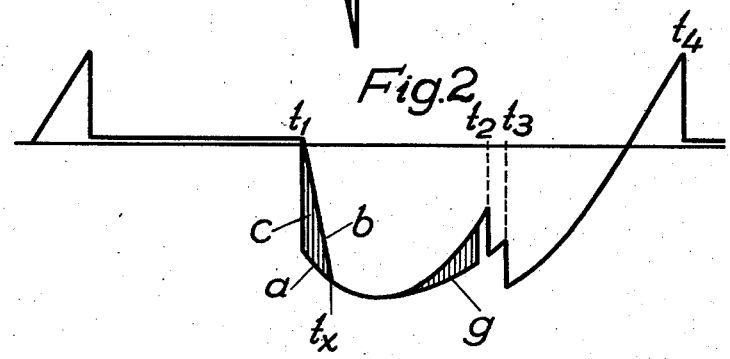
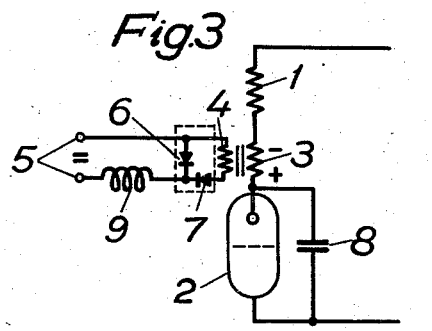
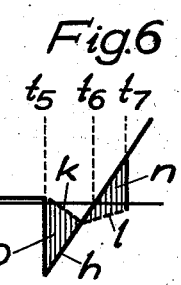
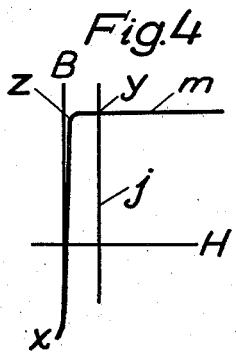
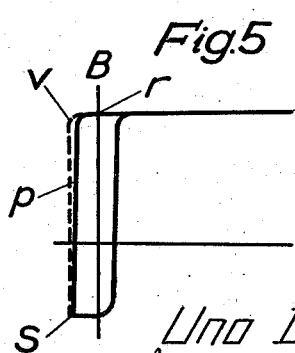
Inventor
Uno Lamm
By James Aikan
Attorney Patented Sept. 14, 1948

2,449,396

UNITED STATES PATENT OFFICE 2,449,396

MEANS FOR INFLUENCING THE BLOCKING VOLTAGE IN CURRENT CONVERTER VALVES

Uno Lamm, Ludvika, Sweden, assignor to Allmänna Svenska Elektriska Aktiebolaget, Västerås, Sweden, a corporation of Sweden Application December 3, 1945, Serial No. 632,471
In Sweden December 23, 1944

13 Claims. (Cl. 315—284)

Static current converters, especially when the commutation is strongly retarded by grid control or otherwise, or when the commutation is forced, are subjected to strong sudden increases or jumps in the voltage across the valves during the blocking interval, said voltage being, for the sake of shortness termed the blocking voltage. It is known, that the voltage jump which occurs immediately after the extinction of the valve path, has a strong tendency to produce a back arcing, as it forms a high tension across the valve path during and in some cases also immediately after the deionisation. Experience has, however, proved that not only the absolute value but also the time derivative of the blocking voltage is of great importance in creating the back arcing phenomenon, and which is possibly due to the fact the high negative voltage acts, before deionization can occur, to create a displacement current proportional to the time derivative of the voltage in the ionized vapor or plasma, which results in an increased ionic bombardment of the anode.

For this reason, it is highly desirable to even out as far as possible the negative voltage across the valve path during the blocking interval, and the present invention relates to means for this purpose.

In the accompanying drawing, Figs. 1 and 2 show two voltage diagrams for an ionic valve during the blocking interval including the modifications thereof involved by certain forms of the invention. Fig. 3 shows a diagram of connections for one form of the invention and Figs. 4 and 5 two alternative magnetizing diagrams for an inductance forming part of the form of Fig. 3. Fig. 6 shows a voltage diagram for an ionic valve for an inverter or for a current converter having forced commutation, comprising the time immediately before and after the commutation.

In Fig. 1, the full drawn curve $a$ designates the voltage across an ionic gas or vapor filled valve in a rectifier commutating in threephase and about 36° in retard of the normal time. $t_1$ designates the instant at which the commutation is terminated, for instance about 46° after the zero passage of the voltage curve, if the angle of overlapping is assumed to be 10°. The negative voltage across the valve path then instantaneously rises to about 70 percent of the crest value, if no equalizing factors exist. Then it continues along a normal sine curve during nearly a third part of a cycle and is further subjected to two other discontinuities at the points $t_2$ and $t_3$, corresponding to the beginning and end of the next commutation. Further it becomes positive during a short period and finally at the instant $t_4$, when that valve is again ignited, for which the curve is taken, it becomes again nearly zero. Also other irregularities of the voltage curve may arise in connection with the commutation in other threephase groups associated with the treated one and in connection with short-circuits or other disturbances in the alternating current system.

The only equalizing factors, which prevent quite instantaneous variations of the voltage curve, are the capacitative currents which arise at the voltage variations in the transformers, in the insulators between anode and cathode, and in the current path during its deionisation. The last-mentioned currents may however, as aforesaid, be assumed to form dangerous sources of back-arcs. It is therefore highly desirable that discontinuities of the voltage curve are equalized, i. e. that the maximum values of the time derivative of the voltage are essentially reduced by other means which cause a much more radical equalisation than the spontaneously arising displacement currents. According to the present invention, this is effected by connecting reactors with iron cores in series with the valve paths and admittances, preferably of the condenser type, in parallel to the said paths, the effective minimum inductance of each such reactor in the unsaturated state of its iron core being so proportioned to the parallel admittance of the valve path, that the reactor under a maximum voltage jump during the blocking interval of the valve and under the influence of only the current in said admittance absorbs a voltage giving a voltage-time integral which is substantially equal to that corresponding to full reversal of the magnetisation of the reactor core from positive to negative saturation.

That is, assuming that under the conditions of a given circuit the highest voltage jump per unit of time occurs at a given retardation of commutation (which will ordinarily be 90°), at such retardation a certain current will flow through a given admittance used in the circuit during part of the blocking interval of the valve or current path. This current flow will cause the reactor to absorb a certain mean voltage for a given period of time (a voltage-time integral). The minimum inductance of the reactor, in the present invention, must be so chosen with respect to the current flow through the admittance under these conditions that this voltage-time integral corresponds to full reversal of magnetization of the reactor core.

The current in the reactor in the sense opposite to that of the load current in the unsaturated state of said reactor is preferably of such an order of magnitude in relation to the admittance of the condenser or its substitute, that the voltage across the reactor does not become zero until at least 5° after the load current has decreased to zero.

It is known to connect in series with the valve paths inductances with saturable iron cores for strongly limiting the current during the first introductory period of a back arc. Such inductances are intended to carry current during a very short time, of the order of magnitude of 1–100 microseconds as a maximum, because it has been held that the phyical phenomena initiating a back arc take place during 100 microseconds as a maximum. It would therefore be of importance to limit strongly the back current during this time in order to prevent its developing into a back arc. In contradistinction to this, the present invention aims at the prevention of such voltage jumps, which form one of the most importance causes of back arcing, and for this purpose an auxiliary current from an admittance in parallel to the valve path is necessary, said admittance being dimensioned according to the aforesaid prescriptions, so as to admit such a current, flowing through the reactor element, as to force the latter to absorb an essential part of the blocking voltage, quite apart from the back current which may flow in the valve during the blocking interval. Preferably, the current drawn through the reactor element by the admittance should, in a valve path of medium capacity having a normal current of 40–50 amperes R. M. S. value, be of the order of magnitude of one ampere. In the known arrangement, on the contrary, the reactor connected in series with the valve path is mainly intended to absorb a voltage under the influence only of the current which flows sporadically under the influence of occasional back arc causes, and the admittance which may be connected in parallel thereto must leave no appreciable current through the reactor. According to the present invention, the maximum current through the reactor in the direction opposite to that of the load current should, in the unsaturated state of the reactor, be many times larger than the back current flowing through the ionic valve in the blocking interval after the first strong deionizing current has ceased.

Fig. 3 shows diagrammatically a current converter valve 2 with a transformer winding 1, the said members forming for instance part of a threephase rectifier group. For a certain phase displacement of the grid control, the voltage curve $a$ shown in Fig. 1 or 2 is obtained across the valve vessel. For modifying this curve so as to avoid negative voltage jumps, a reactor element, having a main winding 3 and a magnetizing winding 4 fed from a direct current source 5 through a reactor 9, is connected in series with each valve path according to Fig. 3. Valve elements 6 and 7 indicated inside a dotted frame line may also form part of the connection. A condenser 8 is connected in parallel to the valve vessel 2. The auxiliary magnetizing current may be introduced directly into the winding 3.

The manner of operation of the connection according to Fig. 3 without the valves 6 and 7 is illustrated by the full-drawn curve $b$ in Fig. 1 and of Fig. 4. As long as a valve vessel 2 is loaded, the iron core of the transductor is very highly saturated, i. e. the working point lies far to the right on the saturation curve $m$ in Fig. 4, and therefore no voltage can be induced in the main winding of the reactor, even if the current varies. The direct current magnetisation by the winding 4 acts in the same sense as the load current, corresponding to the straight line $j$ in Fig. 4. When the load current ceases and a negative voltage suddenly appears between the transformer terminal and the cathode, the voltage across the condenser cannot be instantaneously altered, but the whole voltage is at the first instant applied across the reactor element 3. This means that the magnetisation of the reactor core must be altered at a rate corresponding to the voltage, which cannot be done unless the magnetizing ampereturns thereof are reduced to nearly zero. Since no appreciable current can now traverse the valve, the condenser must furnish a current through the reactor winding 3 in the direction opposite to that of the previous load current, the number of ampereturns of said condenser current being practically equal to the constant number of ampereturns of the winding 4. This current charges the condenser along the line $b$ in Fig. 1, and therefore also the voltage across the valve path parallel to the condenser rises only gradually, while at the same time the voltage across the reactor decreases. In Fig. 1, this latter voltage is at any instant represented by the difference between the ordinates of the curve $a$ and the first part of the curve $b$, and the time integral of said voltage from the time $t_1$ until the instant when it has fallen to zero is thus represented by the hatched surface $c$. This time integral is proportional to the algebraic difference between the magnetic flux of the core in the point $z$ (Fig. 4), where the demagnetisation begins, and in the point $x$ to which the magnetisation is for instance altered. This latter point should be so chosen as to represent, at the maximum voltage jump occurring, nearly full saturation in the opposite direction, in order that the reactor shall be fully utilized. For smaller voltage jump, corresponding to smaller retardation of the phase of ignition, it is of course situated nearer to the H axis or even above the latter. In the example illustrated, the time elapsing before the curves $a$ and $b$ intersect in the point $t_x$ is preferably of the order of magnitude of 15° (phase angle), corresponding at a fifty cycles alternating current to a little less than one millisecond.

At the point $t_x$, there is no voltage across the reactor, but it is still traversed by a current equilibrating the current in the winding 4. The condenser is therefore charged to a still higher voltage. For bringing the current in the reactor down to zero, it is necessary to reverse its magnetisation to the point $y$. This corresponds practically to the same alteration of the magnetisation as from $z$ to $x$, and therefore the time integral of the voltage charging the condenser further, which is represented by the surface $d$ in Fig. 1, will be equal to that represented by the surface $c$. During the whole corresponding time, the voltage across the valve rises also. When the charging current has sunk to zero, a rapid discharging may take place, as the discharging current traverses the reactor in its saturated state, in which it represents no appreciable inductance.

The curve $b$ in Fig. 1 is not especially favorable. While it is free from the steep negative voltage jump at the first instant of the blocking interval, it subjects on the other hand the valve path, during a short part of the said portion, to a considerably higher negative voltage than the normal one. (The steep positive voltage jump at the end of the surface $d$, on the other hand, represents no displacement current in a dangerous direction.) In reality, the conditions may be somewhat improved by making the magnetizing curve not rectangular, as has been nearly assumed for the sake of simplicity in drawing the voltage diagram, but with a more uniform curvature. A more important improvement may, however, be obtained by introducing the unilaterally conducting valves 6 and 7 shown within the dotted rectangle in Fig. 3. During the period corresponding to the voltage surface $c$, the valve 7 is inactive, because the current flows in the direction permitted by the said valve, and at the same time the valve 6 is inactive, because the flux variation in the iron core of the reactor then takes place in such a direction that the winding 3 and thus also the winding 4 has a higher potential at the lower end than at the upper end, for which reason the current flow through the winding 4 is easier than through the valve 6. On the other hand, the valve 7 prevents a flow of current in the winding 4 in the opposite direction, and as the flux in the reactor core has been assumed to correspond to a very small magnetizing current, no appreciable current flows from the aforesaid instant in the winding 3. The charging of the condenser can therefore not be appreciably altered, but the voltage across said condenser and the valve remains substantially constant (line $e$ in Fig. 1). Not until the time integral of the voltage across the reactor, which is represented by the hatched surface $f$ in Fig. 1, has been equal to the voltage integral represented by the surface $c$, which corresponds to the restoration of the original magnetical conditions in the reactor (point $z$ in Fig. 4), the condenser is discharged, and this now takes place practically instantaneously, since the reactor core is now saturated.

The equalizing procedure at the instants $t_2$ and $t_3$ is the same in principle as that now described, although the voltage jumps are smaller here and cannot cause so large flux variations in the reactor core. The valve 6 may be omitted, if for instance the inductance 9 is omitted, but the control of the operation will then be more difficult.

The connection now described gives an even voltage curve, which has no tendency to provoke back arcing, but it has the inconvenience, that the valves 6 and 7 become rather expensive, since their power probably will be some percent of that of the main valve. It is, however, possible to omit these valves, if the core of the inductance is so arranged, that a favorable influence is obtained from hysteresis and eddy currents. In such case, the auxiliary magnetisation on the core of the inductance may either be entirely omitted or essentially reduced. This is illustrated by the magnetizing diagram in Fig. 5 as compared with Fig. 2.

In Fig. 5 as well as in Fig. 4, the magnetizing ampereturns of the inductance 3 are during the operating period strongly positive, corresponding to high saturation and thus to a low inductance. When the valve path is extinguished, the ampereturns are reduced to zero, but the remanent magnetism still exists (point $r$). During the first part of the equalizing period, corresponding to the voltage surface $c$, the condenser is charged by a current corresponding to the coercive force of the magnet core with the addition of the ampereturns of the eddy currents in the core. The latter ones will, as it should not be necessary to count with an appreciable reactance for them at the comparatively low speed of variations, be substantially proportional to the instantaneous value of the voltage, and the sum of the ampereturns of the coercive force and the eddy currents may therefore be represented by the dotted line $v$ in Fig. 5, which meets the negative branch $p$ of the hysteresis loop in the point $s$, representing the voltage zero. When this point has been reached, the condenser current may, on account of the hysteresis, rapidly decrease to zero without any appreciable alteration of the magnetisation, i. e. without generating any voltage in the inductance.

The discharging of the condenser will here begin immediately after the transformer voltage has begun to decrease, since the magnetisation of the reactor initially undergoes no variation (the lower, nearly horizontal part of the hysteresis loop to the right of the point $s$). The reactor cannot begin to take up any voltage before the transformer voltage decreases more rapidly than which corresponds to its demagnetisation by the positive, nearly vertical part of the hysteresis loop. This corresponds to a slope of the curve $g$ in Fig. 2, which is so much smaller than the slope of the curve $b$ as is the H-value for the positive branch of the hysteresis loop than the H-value of the negative one, the latter one reinforced by the influence of the eddy currents, which do not exist at the beginning of the positive branch, when the voltage is zero. Since it is desirable that the original state of magnetisation of the reactor 3 has been restored before the instant $t_2$, when the next voltage jump occurs, this condition necessitates a rather dissymmetrical shape of the hysteresis loop. Such a dissymmetry is promoted not only by the fact that the magnetisation is not allowed to rise to full saturation in the point $s$, but also by the influence of the eddy currents, which if necessary may be increased by employing comparatively thick laminations in the reactor core, for instance essentially thicker than that usual in alteration current cores (0.35–0.5 mm.). The reactor may also be provided with a secondary winding having a substantially resistive circuit, which acts in the same manner as increased eddy currents. Finally it is possible to provoke a dissymmetrical hysteresis loop by an additional magnetisation, the M. M. F. of which is smaller than that of the coercive force and which acts in the same direction as the additional magnetisation by the coil 4, but which, contrary to the latter, exerts the best action if maintained during the unloading of the condenser, thus not short-circuited by valves.

In a current converter having forced commutation or acting as an inverter with a large phase displacement of the grid voltage, the voltage across the valve immediately after the termination of the commutation may have the course illustrated by the full-drawn curve $h$ in Fig. 6. The time from the instant $t_5$, when the commutation is terminated, to the instant $t_6$, when the voltage across the valve path normally becomes positive, must be sufficient for such a deionisation of the recently current-carrying valve path, that there is no risk of the valve path being again ignited, which would cause a short-circuit. By introducing a series-connected reactor and a parallel-connected condenser arranged and dimensioned according to the present invention, possibly with somewhat larger admittance than that required in an ordinary rectifier, the curve representing the voltage across the valve path may be modified according to the dotted lines $k$, $l$ in Fig. 6. The hatched surface $o$ then corresponds to the surface $c$ in Fig. 1 or 2, i. e. to the variation of the magnetisation state of the reactor element accompanied by a charging of the condenser, while the hatched surface $n$ of equal size, which essentially lies after the zero passage of the voltage, corresponds to the restoration of the original state of magnetisation, accompanied by the discharging of the condenser. In this case, the voltage across the valve path will not be positive until the last-mentioned procedure is terminated, i. e. at the instant $t_7$. The time between $t_6$ and $t_7$ is therefore gained for the deionisation, i. e. by introducing the reactor and the condenser it becomes possible to terminate the commutation later and thus to raise the proportion between direct current and alternating current voltage without running the risk of not terminating the commutation in time. In the case of a forced commutation, a corresponding measure means that the commutation may be effected with a smaller power demand, for instance by a smaller condenser. When the invention is applied according to Fig. 6, it is possible to replace the condenser by an admittance of a somewhat different character, which makes the valve assume a very low negative voltage during the whole time $t_5-t_7$. In this manner the time $t_6-t_7$ may be made about as long as the time $t_5-t_6$ and the time available for the deionisation may thus be extended.

During the parts of the blocking period of an inverter, in which the valve path is subjected to a voltage in the positive direction but is blocked by the grid, such charging and discharging currents may also arise in the condenser, which alter the state of magnetisation of the reactor element and cause the said element to absorb a portion of the variations in the voltage. In this manner the reactor element may be saturated in the opposite direction against that caused by the normal operating current ("negative direction"), when the valve is liberated by its grid, which means that the valve takes over the current with some retardation. This may, however, be easily compensated by the grid liberating the valve path earlier.

For effecting the best possible action of the hysteresis of the iron core, it is advisable to choose such a plate material, which has a high ratio between the remanent magnetism and the saturation value. This property, which seems to be rather independent of the absolute value of the coercive force, may in most iron alloys of high permeability (which are here in the first line employed) be obtained by a suitable heat treatment. In Fig. 5, it has been assumed for the sake of simplicity, that the ratio between remanence and saturation value is practically = 1. In reality this differs rather much from this ideal value, and this difference presents itself substantially in the following manner in the operation of the reactor. First the (algebraic) difference between magnetic flux in the points $r$ and $s$ (Fig. 5), to which difference the surface $c$ in Fig. 1 or 2 is proportional, becomes smaller for a certain size of the reactor and for a certain saturation value in its iron core, whence it may be necessary, in order to obtain a certain slope of the curve $b$ in Fig. 1 and/or a certain distance between the instants $t_1$ and $t_x$, to choose a somewhat larger reactor than with the ideal magnetizing curve. As a high ratio between remanence and saturation value, however, generally corresponds to a high value of the latter (for instance in nearly pure iron), the variations in the absolute value of the remanence from one magnetic material to another will frequently not be so large as the variations of the ratio. A low relative value of the remanence has, however, another inconvenience. The entire variation in the magnetic flux lying at the positive side of the B-axis and thus presenting itself at normal direction of current, before the load current has decreased to zero, represents a reactance for the load current, which adds itself to the normal commutating reactance and thus increases the time of overlapping. It is important that this additional reactance is not too large, and it is at any rate desirable that the total mean reactance for the normal load current, inclusive of that depending on the air flux, is smaller than the normal reactance. Such a result can always be obtained by employing special magnetic material, but it appears possible to obtain it also in employing ordinary transformer iron in the reactor.

In general it is advisable to apply for the reactor in designing, dimensioning and choice of material the rules valid for direct current saturable reactor elements in general. Since it is in many cases desirable that a marked hysteresis is obtained in the reactor, it may also be advantageous to take steps, as have been recommended earlier for obtaining such an effect for "suppressing equalization," for instance to compose the iron core of parts having different magnetic properties. An appropriate construction for this purpose may be to connect parts having different magnetic properties in series, for instance to construct the major part of the magnetisation of soft (comparatively hysteresis-free) material, but a smaller part, for instance a yoke or a part of a yoke, of hard steel of the known kind, for which the remanence value lies only a trifle below the saturation value. The cross-section of the different parts made from material with different magnetic properties should then be so chosen, that a saturation is obtained substantially at the same time in the whole circuit.

It should also be observed that for a comparatively softly bent magnetizing curve, as is obtained for instance for usual transformer iron, the eddy currents in the core—possibly reinforced by a secondary winding in the aforesaid manner—cause an action, which is equivalent to an increase of the remanence. As soon as the flux in the core of the reactor begins to decrease appreciably, eddy currents are generated in the core, which in respect of the core act as positive ampereturns in relation to the load current. The more rapidly the decrease the higher will be the voltage and the stronger the eddy currents. Counting with a predetermined rate of decrease of the current depending on the dominating external reactances and the available voltage difference the voltage generating the eddy currents will when approaching B-axis (zero passage of the current) be essentially proportional to the slope of the magnetizing curve $$\left(\frac{dB}{dH}\right)$$

at this point. Since the eddy currents here act as positive ampereturns, which must be compensated by negative ampereturns in the main winding, corresponding to a displacement of the decreasing branch of the hysteresis loop to the negative side, the point of intersection between this branch and the B-axis, the distance from the origin of which represents the apparent remanence, will be raised at a measure, which under otherwise equal conditions is proportional to the square of $$\frac{dB}{dH}$$

at this part of the magnetizing curve. For ordinary transformer iron it can be assumed, that the apparent remanence can in this way be raised from for instance 6000 to 14,000 gauss.

If on the other hand the iron core should have, as a consequence of any one of the constructions described or for other reasons, satisfactory remanence and coercive force without paying respect to the eddy currents, it may be advisable to take steps for reducing the latter currents, for instance to use especially thin laminations in the core. This causes among others a reduction of the condenser current at the beginning of the equalizing procedure, which gives a more favorable form of the curve b in Fig. 1 or 2 with a less steep slope at the beginning, when the valve path is most sensitive to steep voltage rises.

As an example of the form of the invention now described, the following may be mentioned, counting with a reactor with usual transformer iron. For the reactor, having a direct current voltage of 40 kv., the maximum voltage bound at maximum phase retardation of the ignition amounts to about the same value. For damping this voltage bound a reactor is introduced, the iron core of which has a cross section of 120 cm.$^2$ and an effective remanence (including the influence of the eddy currents) of 14,000 gauss, while the number of winding turns is 600. When the magnetisation is reversed from $+14,000$ to $-14,000$, this corresponds to a volt-second number of $28,000 \cdot 120 \cdot 600 \cdot 10^{-8} = 20$, i. e. for a voltage bound of 40 kv. an equalizing time of 1 millisecond, corresponding to 18° electrical angle. There is thus an ample margin for reaching the equalizing time of about 15° assumed in the voltage diagram.

The assumed values of the core cross-section and of the winding turn number require in practice a core length of about 200 cm. The coercive force of the iron is assumed to 0.4 ampereturn per centimeter, and the action of the eddy currents is assumed to correspond to one turn having a purely ohmic resistance of 0.13 ohm. Assuming that when the load current decreases to zero, about three quarters of the voltage are applied across the reactor, the current in the aforesaid equivalent resistance will be $$\frac{30,000}{600 \cdot 1.3} = 380 \text{ amperes}$$

corresponding to 1.9 ampereturns per centimeter. A close examination shows that the hysteresis loop is hereby displaced so much, that the apparent remanence is raised from 6000 to 14,000 gauss. During the continued variation in the magnetisation of the reactor, the voltage across the same gradually decreases to zero, and then also the eddy currents decrease in about the same proportion. The mean value of the sum of eddy currents and hysteresis, however, amounts to about 1.4 ampereturns per centimeter, corresponding to a primary current in the winding of the reactor of about $$\frac{1.4 \cdot 200}{600} = 0.47 \text{ amperes}$$

If the condenser shall be loaded by this current to 40,000 volts in 1 millisecond, its capacity will be $$\frac{0.47 \cdot 0.001}{40,000} = 0.012 \cdot 10^{-6} \text{ farad}$$

The normal load current (the nominal current) pro valve is in the example described assumed to be 40 amperes R. M. S. value.

As is well-known, the parallel connection of a conducting gas or vapor path and a condenser brings about a certain risk of a generation of non-desirable oscillations, which may make the current in the gas or vapor path unstable. For preventing the generation of such oscillations or for limiting them to permissible values, damping circuits of a kind known per se, containing for instance condensers or resistances, may be employed. It may also be advisable to connect resistances in series or in parallel with the condenser or with the reactor element for the same purpose.

Looking on the invention in a wider aspect, it may be of interest to notice that the direct current saturable reactor element provided with only a main winding operates in itself as a one-way valve for the current. As a current valve the reactor element has, however, the limitation, that during each cycle it must take up equal positive and negative voltage-time integral. The combination between a reactor element and an ionic valve may thus be looked upon as that of two series connected valves, the latter of which has to take up the surplus of voltage surface of one polarity, while the former can assist it herein by adding or subtracting a voltage-time integral of a suitable shape. Regarding the external action it is unimportant in principle, how the two valves mutually divide the voltage, and therefore it is also possible to apply the invention to only one or some of the valves in a current converter. If it should be found in practice, that some of the individual valve paths of a current converter are especially sensitive to the risks which the present invention serves to prevent, the invention can therefore in some cases be applied only to such valve paths, while the other ones are constructed in the hitherto usual manner.

In two-way current converters it is possible to make the reactors common to two valve paths by connecting them in the alternating current conductors common to both. The reason for this is that the valve paths connected to the same alternating current conductor do not as a rule commutate simultaneously.

The term "substantially instantaneous admittance" as used herein is intended to designate an admittance such as a condenser or a resistance, or a combination thereof, which acts without substantial lag, as contrasted with a reactance, for example.

The term "voltage-time integral" as used herein is intended to mean, for a given interval, the product of the time by the average voltage during such interval, or, in effect, a quantity proportional to the amount of change in magnetization of the magnetic device creating the voltage.

I claim as my invention:

1. In a static current converter, a gas or vapor containing current path, an inductive reactor containing an iron core connected in series with said current path, and a substantially instantaneous admittance connected in parallel directly across said current path, the minimum inductance of said reactor in its unsaturated state being so dimensioned with respect to said admittance that said reactor absorbs a voltage giving a voltage time integral substantially corresponding to full reversal of the magnetization of said reactor core from positive to negative saturation.

2. In a converter as claimed in claim 1, said admittance comprising a condenser.

3. In a converter as claimed in claim 1, the zero passage of the voltage across the reactor taking place at least five degrees after the zero passage of the load current.

4. In a converter as claimed in claim 1, in which said current path includes a valve, means to apply to said reactor auxiliary direct current magnetization acting in the same direction as the load current of said valve.

5. In a converter as claimed in claim 4, said last means applying a number of ampereturns substantially equal to those of the current admitted by said admittance.

6. In a converter as claimed in claim 5, said last means including a magnetizing winding and a unilaterally conducting valve in series therewith.

7. In a converter as claimed in claim 6, a second unilaterally conducting valve in parallel with said winding and first valve, said second valve passing current only when a positive potential exists on the side of the winding remote from the first valve.

8. In a converter as claimed in claim 1, in which said current path includes a valve, means to apply to said reactor auxiliary direct current magnetization acting in the same direction as the load current of said valve, said means furnishing less ampereturns than the coercive force of the iron core of the reactor.

9. In a converter as claimed in claim 1, said reactor having a secondary circuit of substantially resistive character.

10. In a converter as claimed in claim 1, the reactance of said reactor at full saturation being less than the commutation reactance of said current path.

11. In a converter as claimed in claim 1, said reactor core being composed of magnetic materials of different properties so as to have a high ratio between remanence value and saturation value.

12. In a converter as claimed in claim 1, said voltage-time integral being substantially restored by said reactor after commutation.

13. In a converter as claimed in claim 1, said minimum inductance being so chosen that the maximum current flowing through the reactor in the opposite direction to that of the main current is several times larger than the back current flowing through the current path during its blocking interval after the first strong deionizing current has ceased.

UNO LAMM.

REFERENCES CITED

The following references are of record in the file of this patent:

UNITED STATES PATENTS

| Number | Name | Date |
|---|---|---|
| 781,603 | Hewitt | Jan. 21, 1905 |
| 1,251,377 | Hull | Dec. 25, 1917 |
| 1,682,000 | Willard et al. | Aug. 28, 1928 |
| 1,954,028 | Stansbury | Apr. 10, 1934 |
| 2,125,799 | Metcalf | Aug. 2, 1938 |
| 2,169,818 | Scott | Aug. 15, 1939 |